July 20, 1965 V. D. KNISELY ETAL 3,195,920
REPLACEABLE TRUCK FLAP
Filed March 22, 1963
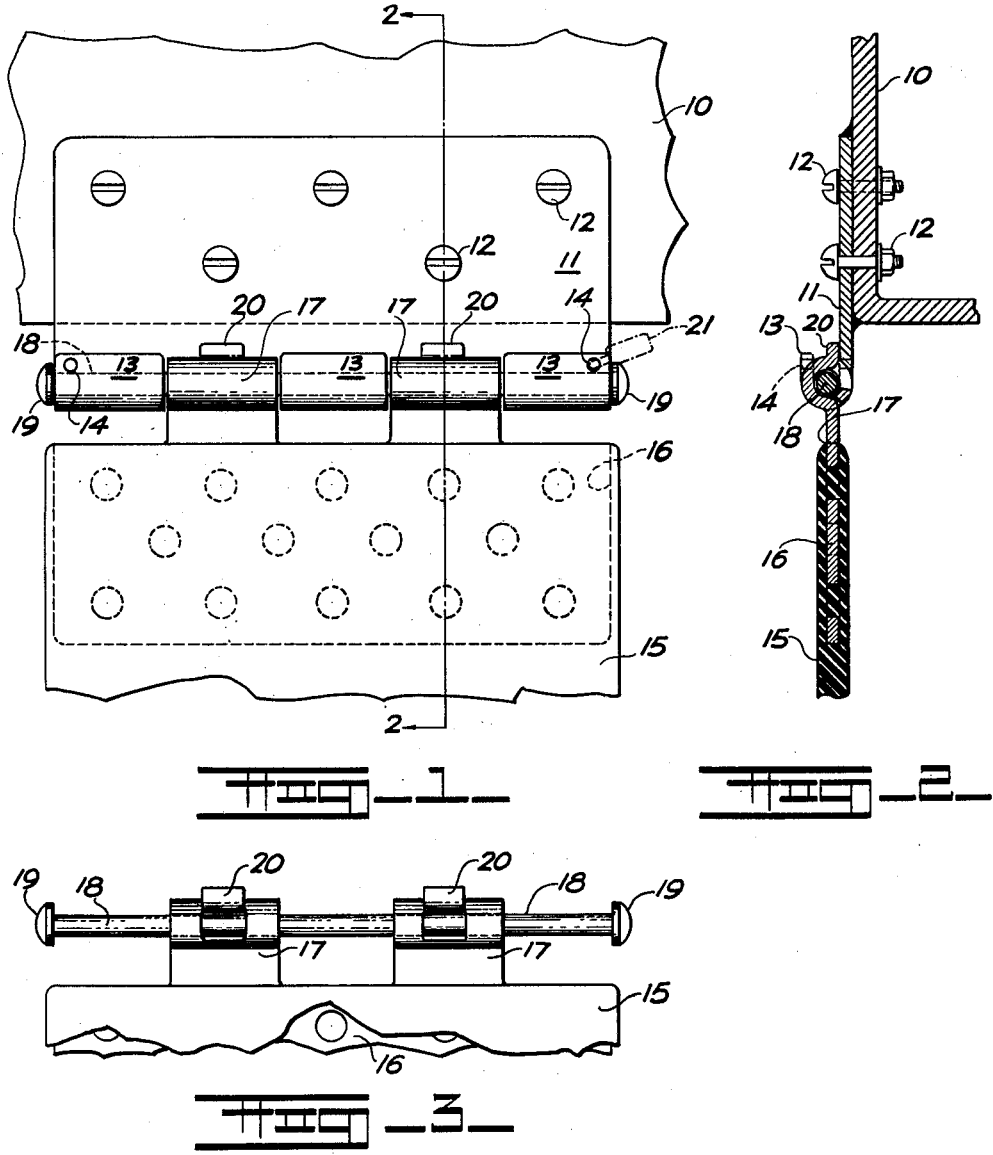
INVENTORS
Victor D. Knisely & Charles H. Rennels
BY W. B. Harpman
ATTORNEY.

United States Patent Office 3,195,920
Patented July 20, 1965

3,195,920
REPLACEABLE TRUCK FLAP
Victor D. Knisely, R.D. 1, Columbiana, Ohio, and
Charles H. Rennels, 509 Laird Ave., Poland, Ohio
Filed Mar. 22, 1963, Ser. No. 267,151
2 Claims. (Cl. 280—154.5)

This invention relates to a truck flap and more particularly to a truck flap that may be readily removed and replaced.

The principal object of the invention is the provision of a truck flap of the type that is required by law in many localities to be placed behind the wheels of a truck so as to form a yieldable surface or baffle against which the tire spray is directed and received.

A further object of the invention is the provision of a replaceable truck flap that incorporates a modified hinge construction permitting controlled movement of the truck flap.

A further object of the invention is the provision of a truck flap that may be locked in position on the truck and readily unlocked for removal or replacement.

A still further object of the invention is the provision of a truck flap in which the flap body incorporates a metal hinge portion extending outwardly of one edge thereof.

The truck flap disclosed herein comprises an improvement in the art relating to such devices which are commonly used on the back portions of trucks or trailers and attached to the truck or trailer body or frame so as to depend therefrom directly in back of the wheels of the truck or trailer. Heretofore such truck flaps have generally comprised single sections of molded rubber apertured along their upper edges so that they could be bolted or similarly permanently attached to the truck body or frame. Such devices have a relatively short life in use and the problem of replacing them becomes difficult when the bolts or similar attachment devices that are usually employed become rusty or coated with tar or other road surfacing materials.

The present invention relates to an improved truck flap which incorporates a hinge-like construction, one portion of which is permanently attached to the truck body or frame and the other portion of which is formed as a portion of the actual truck flap. The hinge construction is readily separable and provides for placing a pad lock to prevent unauthorized removal of the truck flap from the permanent attachment. The invention as disclosed herein may therefore be quickly unlocked, readily lifted out of its hinged relation to the permanently attached portion and replaced when necessary without regard to the condition of the bolts or fasteners by which the device is normally secured to the truck.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a plan view of a portion of a truck frame and a truck flap attached thereto and suspended therefrom with parts of the frame and the flap broken away.

FIGURE 2 is a vertical section on line 2—2 of FIGURE 1.

FIGURE 3 is a plan view of the upper portion of the truck flap seen in FIGURE 1 showing the hinge pin.

By referring to the drawings and FIGURE 1 in particular, it will be seen that a portion of a truck or trailer frame is disclosed and indicated by the numeral 10, the same being that portion thereof extending across the back end of the truck or trailer and therefore located behind the road engaging wheels thereof. A bracket 11 having apertures therein is secured to the frame 10 by a plurality of fasteners 12, 12. The lower edge of the bracket 11 has a plurality of transversely spaced depending U-shaped portions 13, 13, at least one of which is provided with oppositely disposed horizontally aligned apertures 14. The bracket 11 and the plurality of U-shaped portions 13, 13 therebelow form means for receiving and holding a truck flap comprising a resilient flat vertically disposed body member 15 having an apertured metal plate 16 therein with a pair of horizontally spaced upwardly extending looped sections 17, 17 thereon. The looped sections 17, 17 as best seen in FIGURE 3 of the drawings define transversely disposed circular passageways through which a hinge pin 18 is disposed. The ends of the hinge pin 18 are headed as at 19, 19 and it will be observed that the pin 18 is positioned in spaced vertical relation to the upper edge of the truck flap 15 so that the exposed portions of the hinge pin 18 may be positioned in the U-shaped portions 13, 13 of the bracket 11 heretofore described and the truck flap 15 hingedly supported thereon. Portions of the looped sections 17, 17 are preferably upturned as at 20, 20 to form lugs which will bear against the face of the bracket 11 and thereby control the motion of the flap 15 relative thereto. This construction is best illustrated in FIGURE 2 of the drawings which shows a cross section through the respective parts.

It will be obvious to those skilled in the art that the apertured metal plate 16 is positioned in the mold in which the truck flap 15 is formed and molded into the same so that it becomes an integral part thereof and it will also occur to those skilled in the art that if desired the metal bracket 11 can be welded to the truck frame or body rather than secured thereto with fasteners as illustrated and described herein. It will also be obvious that the lugs 20 may be dispensed with and the truck flap 15 permitted to hang free on the U-shaped portions 13 of the plate 11 as desired.

In FIGURE 1 of the drawings, broken lines 21 indicate a pad lock, the hasp of which is positioned through the opening 14 in the depending portions 13 and which therefore in effect forms a closure about the hinge pin 18 which prevents it from being lifted out of its normal position therein. It is thus necessary for the pad lock to be removed before the truck flap as shown in FIGURE 1 may be removed from the truck, but at such time as the pad lock 21 is removed the flap 15 may be very easily removed and replaced thereby meeting the several objects of the invention.

It will thus be seen that a truck flap of an improved construction incorporating numerous advantages over those heretofore known in the art has been disclosed in accordance with the objects of the invention, and having thus described our invention, what we claim is:

1. A truck flap comprising a two-part construction hingedly interconnected, one part of which comprises a bracket attachable to a truck or body and having a plurality of spaced U-shaped depending portions along its lower edge and the other part comprising a flat body having a plurality of spaced upstanding looped portions on its upper edge, a hinge pin disposed through said looped portions and normally engaged in said U-shaped portions said flat body being formed resilient material with the upstanding portions comprising extending parts of an apertured metal plate positioned therein.

2. The truck flap set forth in claim 1 and wherein said U-shaped portions are apertured and a padlock is positioned through said apertures to retain said looped portions in said U-shaped portions.

References Cited by the Examiner

UNITED STATES PATENTS

| | | | |
|---|---|---|---|
| 2,591,196 | 4/52 | Post. | |
| 2,644,192 | 7/53 | McClellan | 16—172 |
| 2,683,612 | 7/54 | Bacino | 280—154.5 |
| 2,777,710 | 1/57 | Panchesine | 280—154.5 |
| 2,809,848 | 10/57 | Carswell | 280—154.5 |
| 2,826,428 | 3/58 | Lincoln | 280—154.5 |
| 3,057,643 | 10/62 | Eberwine | 280—154.5 |

A. HARRY LEVY, *Primary Examiner.*

LEO FRIAGLIA, *Examiner.*